(12) United States Patent
Fan et al.

(10) Patent No.: US 9,767,011 B2
(45) Date of Patent: Sep. 19, 2017

(54) GLOBALIZATION TESTING MANAGEMENT USING A SET OF GLOBALIZATION TESTING OPERATIONS

(71) Applicant: International Business Machines Corporation, Armonk, NY (US)

(72) Inventors: Yang Fan, Beijing (CN); Denise M. Genty, Austin, TX (US); Su Liu, Austin, TX (US); Boyi Tzen, Taipei (TW)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 14/956,155

(22) Filed: Dec. 1, 2015

(65) Prior Publication Data
US 2017/0153970 A1 Jun. 1, 2017

(51) Int. Cl.
*G06F 15/16* (2006.01)
*G06F 11/36* (2006.01)

(52) U.S. Cl.
CPC ...... *G06F 11/3692* (2013.01); *G06F 11/3684* (2013.01); *G06F 11/3688* (2013.01); *G06F 11/3672* (2013.01)

(58) Field of Classification Search
CPC combination set(s) only.
See application file for complete search history.

(56) References Cited

U.S. PATENT DOCUMENTS

| | | | |
|---|---|---|---|
| 4,903,199 A | 2/1990 | Keenan et al. | |
| 5,263,162 A | 11/1993 | Lundeby | |
| 5,628,017 A | 5/1997 | Kimmerly et al. | |
| 6,073,090 A | 6/2000 | Fortune et al. | |
| 6,567,973 B1 | 5/2003 | Yamamoto et al. | |
| 6,611,842 B1* | 8/2003 | Brown | G06Q 30/02 |
| 6,735,759 B1 | 5/2004 | Yamamoto et al. | |
| 6,829,551 B2* | 12/2004 | Von Der Hardt | B01D 65/102 |
| | | | 210/321.69 |
| 6,857,022 B1 | 2/2005 | Scanlan | |
| 6,931,628 B2 | 8/2005 | McGeorge, Jr. | |
| 7,024,365 B1* | 4/2006 | Koff | G06F 9/4448 |
| | | | 704/270.1 |
| 7,143,391 B1 | 11/2006 | Guo | |
| 7,299,452 B1* | 11/2007 | Zhang | G06F 17/2223 |
| | | | 704/8 |

(Continued)

FOREIGN PATENT DOCUMENTS

EP 2597569 A1 5/2013

OTHER PUBLICATIONS

Mell, Peter, et al., The NIST Definition of Cloud Computing, National Institute of Standards and Technology, Oct. 7, 2009, Version 15, NIST, Gaithersburg, MD, US.

(Continued)

*Primary Examiner* — Krisna Lim
(74) *Attorney, Agent, or Firm* — Nicholas D. Bowman

(57) ABSTRACT

Disclosed aspects may include collecting a set of globalization data. The set of globalization data may relate to a set of globalization parameters. Based on the set of globalization data, it may be determined to execute a set of globalization testing operations. Accordingly, the set of globalization data may be processed by executing the set of globalization testing operations. In response to the processing, a set of globalization test output data can be established.

20 Claims, 9 Drawing Sheets

(56) References Cited

U.S. PATENT DOCUMENTS

| | | | |
|---|---|---|---|
| 7,509,318 B2* | 3/2009 | Shaath | G06F 9/4448 |
| 7,752,501 B2 | 7/2010 | Bak | |
| 7,761,288 B2 | 7/2010 | Parnell et al. | |
| 7,793,156 B2 | 9/2010 | Tsurumi et al. | |
| 7,810,067 B2* | 10/2010 | Kaelicke | G06F 8/20 717/102 |
| 7,895,576 B2 | 2/2011 | Chang et al. | |
| 7,904,595 B2 | 3/2011 | Cheng et al. | |
| 8,209,732 B2* | 6/2012 | Le | H04N 17/00 348/180 |
| 8,271,263 B2 | 9/2012 | Bush et al. | |
| 8,341,281 B2 | 12/2012 | Taylor | |
| 8,392,872 B2 | 3/2013 | Bak et al. | |
| 8,447,586 B2 | 5/2013 | Aoyama et al. | |
| 8,489,980 B2 | 7/2013 | Lakritz | |
| 8,707,070 B2* | 4/2014 | Muller | 713/300 |
| 8,762,317 B2 | 6/2014 | Sahibzada et al. | |
| 8,910,110 B2 | 12/2014 | Raffo et al. | |
| 8,997,055 B2 | 3/2015 | van Gogh et al. | |
| 9,021,008 B1* | 4/2015 | Andrus | H04L 43/50 709/201 |
| 9,141,522 B1* | 9/2015 | Zias | G06F 11/3688 |
| 9,317,411 B2* | 4/2016 | Kalyanasundram | G06F 11/3688 |
| 2002/0077807 A1 | 6/2002 | Davis et al. | |
| 2002/0123878 A1 | 9/2002 | Menke | |
| 2002/0143523 A1 | 10/2002 | Balaji et al. | |
| 2002/0184610 A1 | 12/2002 | Chong et al. | |
| 2005/0086044 A1 | 4/2005 | Hess et al. | |
| 2005/0240393 A1 | 10/2005 | Glosson | |
| 2005/0267733 A1 | 12/2005 | Hueber et al. | |
| 2006/0026464 A1 | 2/2006 | Atkin et al. | |
| 2006/0116864 A1 | 6/2006 | McHugh et al. | |
| 2007/0112714 A1 | 5/2007 | Fairweather | |
| 2008/0244064 A1* | 10/2008 | Yeung | H04L 41/5038 709/224 |
| 2009/0030674 A1 | 1/2009 | Chakra et al. | |
| 2009/0031170 A1 | 1/2009 | Tsurumi et al. | |
| 2009/0248396 A1 | 10/2009 | Fujiwara et al. | |
| 2010/0064178 A1 | 3/2010 | Dhulipalla et al. | |
| 2010/0100369 A1 | 4/2010 | Shetty et al. | |
| 2010/0180158 A1* | 7/2010 | Corry | G06F 11/3419 714/38.14 |
| 2010/0211377 A1 | 8/2010 | Aoyama et al. | |
| 2011/0239013 A1* | 9/2011 | Muller | G06F 1/3221 713/320 |
| 2011/0270602 A1 | 11/2011 | Liu et al. | |
| 2012/0016655 A1 | 1/2012 | Travieso et al. | |
| 2012/0035913 A1 | 2/2012 | Hametner | |
| 2012/0069131 A1* | 3/2012 | Abelow | G06Q 10/067 348/14.01 |
| 2012/0173900 A1* | 7/2012 | Diab | H04L 12/10 713/310 |
| 2012/0240124 A1* | 9/2012 | Lipton | G06F 9/5066 718/104 |
| 2012/0310625 A1 | 12/2012 | Wei | |
| 2013/0013286 A1 | 1/2013 | Rodet et al. | |
| 2014/0006465 A1 | 1/2014 | Davis et al. | |
| 2014/0007239 A1 | 1/2014 | Sharpe et al. | |
| 2014/0129209 A1 | 5/2014 | Saleme et al. | |
| 2014/0195220 A1 | 7/2014 | Pachipala et al. | |
| 2014/0278342 A1 | 9/2014 | Shoshan et al. | |
| 2014/0309983 A1 | 10/2014 | Lerum et al. | |
| 2014/0365174 A1* | 12/2014 | Arlitt | G06Q 50/06 702/182 |
| 2015/0026524 A1 | 1/2015 | Cao et al. | |
| 2015/0039941 A1* | 2/2015 | Kalyanasundram | G06F 11/3688 714/38.1 |
| 2015/0100684 A1* | 4/2015 | Maes | G06F 11/3672 709/224 |
| 2015/0143456 A1 | 5/2015 | Raleigh et al. | |
| 2015/0169432 A1* | 6/2015 | Sinyagin | G06F 11/3684 717/124 |
| 2015/0199197 A1* | 7/2015 | Maes | G06F 8/71 717/122 |
| 2016/0019205 A1 | 1/2016 | Kidwai et al. | |
| 2016/0062880 A1* | 3/2016 | Moretto | G06F 11/3692 714/38.1 |

OTHER PUBLICATIONS

Disclosed anonymously (Mar. 2013). Efficient globalization of software resources. IPCOM000226037D.

Offutt, J. (2014). Globalization—standards for research quality. Software Testing, Verification and Reliability, 24(2), 83-84.

Disclosed anonymously (Dec. 2012). A way to improve globalization test efficiency for software installation using direct image comparison. IPCOM000224223D.

List of IBM Patents or Patent Applications Treated as Related.

Wikipedia, Subroutine, www.archive.org, 2014 pp. 1-14.

IBM, "Globalization Verification Test Services", printed Mar. 31, 2017, accessed using the Internet Archive Wayback Machine, 2 pages.

Venga, "Software Industry Expertise", printed Mar. 31, 2017, 3 pages, Copyright © 2017 Venga.

Sandru et al., "Changing Role of Test Manager in Changing Situations", IJCEM International Journal of Computational Engineering & Management, vol. 16 Issue 1, Jan. 2013, pp. 1-7.

Anonymous, "Algorithm for Measuring Software Development "Agility" via Tracking Source Code and Test Case File Statistics", An IP.com Prior Art Database Technical Disclosure, IP.com Number: 000226517, IP.com Electronic Publication: Apr. 12, 2013, 5 pages.

Hashmi et al., "Using the Cloud to Facilitate Global Software Development Challenges", 2011 Sixth IEEE International conference on Global Software Engineering Workshops, © 2011 IEEE, pp. 70-77.

* cited by examiner

GLOBALIZATION TESTING MANAGEMENT USING A SET OF GLOBALIZATION TESTING OPERATIONS

BACKGROUND

This disclosure relates generally to computer systems and, more particularly, relates to globalization testing management. The amount of data that needs to be tested or managed by enterprises is increasing. Globalization testing may be desired to be performed as efficiently as possible. As data needing to be tested or managed increases, the need for efficient globalization testing may increase.

Globalization enablement features can relate to processing national data in correct format, correct language, and correct information. In order to deliver the correct globalization enabled features and services, a skilled globalization verification team can be burdensome to execute a set of globalization enablement verification tests in early development stages. Globalization verification may present challenges due to a lack of globalization skilled staff, correct test cases, and funding.

SUMMARY

Disclosed aspects can support online or cloud environment globalization verification testing which may have positive impacts on on-site support levels, security accessing management tasks, or development agility by separating globalization verification service from product development. Aspects of the disclosure may include collecting a set of globalization data. The set of globalization data may relate to a set of globalization parameters. Based on the set of globalization data, it may be determined to execute a set of globalization testing operations. Accordingly, the set of globalization data may be processed by executing the set of globalization testing operations. In response to the processing, a set of globalization test output data can be established.

In embodiments, the set of globalization testing operations includes at least one of a translatability testing operation, an encoding testing operation, or a truncation testing operation. In embodiments, use of the globalization testing management is metered. Based on the metered use, an invoice may be generated. Altogether, performance or efficiency benefits with respect to a globalization testing management can occur (e.g., speed, flexibility, responsiveness, resource usage, productivity).

The above summary is not intended to describe each illustrated embodiment or every implementation of the present disclosure.

BRIEF DESCRIPTION OF THE SEVERAL VIEWS OF THE DRAWINGS

The drawings included in the present application are incorporated into, and form part of, the specification. They illustrate embodiments of the present disclosure and, along with the description, serve to explain the principles of the disclosure. The drawings are only illustrative of certain embodiments and do not limit the disclosure.

Figure 1:
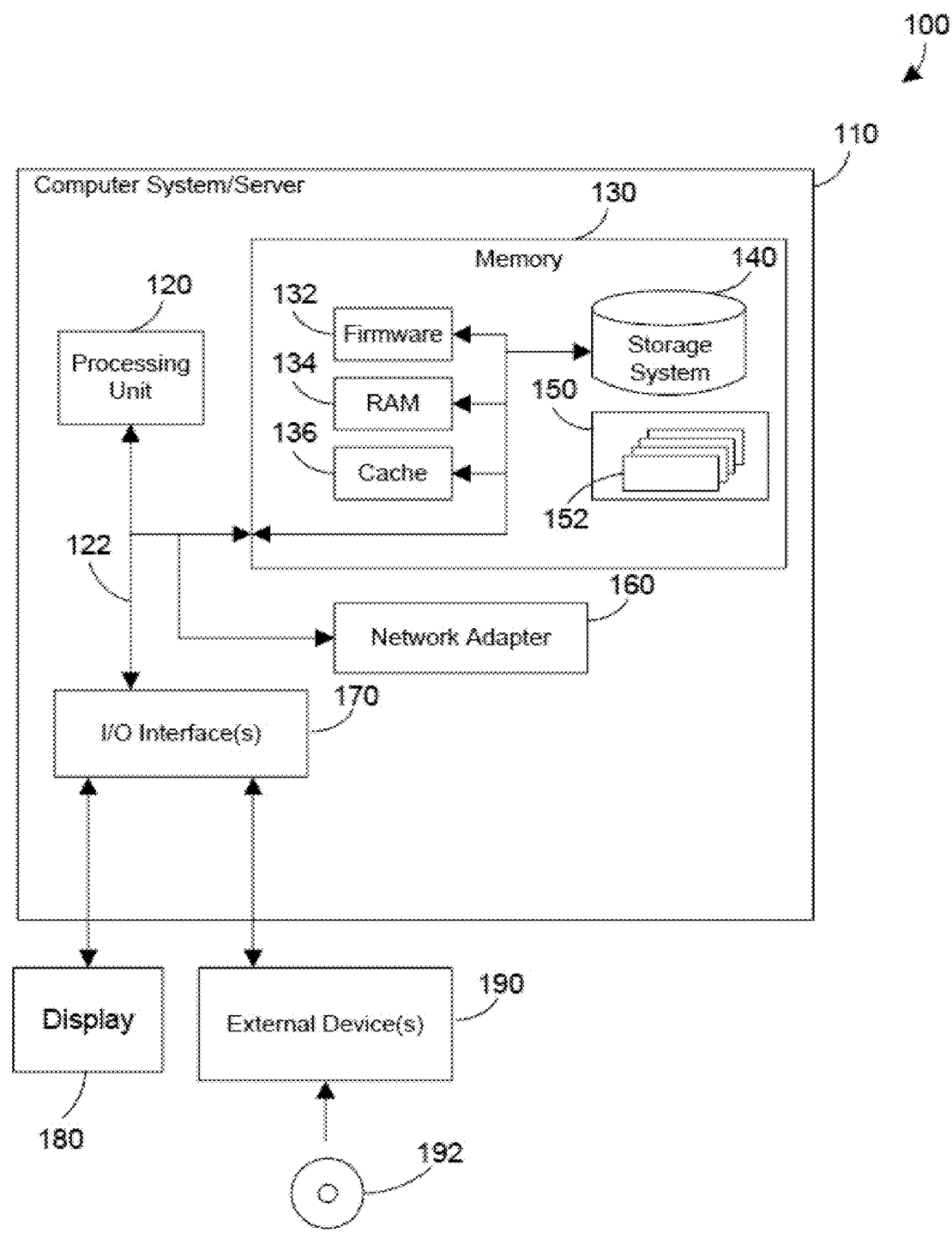
FIG. 1 depicts a cloud computing node according to embodiments.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention.

DETAILED DESCRIPTION

Aspects of the disclosure include automating an on-line or cloud globalization testing service. An automated globalization testing/verification service framework may be constructed. The framework can include a client side globalization feature abstracter and a server side globalization test application programming interface (API). Globalization aspects may be extracted from a client development environment by the client side globalization feature abstracter. Such aspects can include enabled languages, locale names, routines, APIs, and message buffer sizes which can form a client side globalization data. The client side feature abstracter may instrument the client side globalization data to form a data set usable by the server side globalization test application. In response to receiving a sampled client side globalization data by the service side globalization test application, a testing service may be performed and charged-for.

Globalization enablement features may have positive impacts to processing national data in correct format, correct language, and correct information. In order to deliver the correct globalization enabled features and services, a skilled globalization verification team can be burdensome (e.g., costly) to execute a set of globalization enablement verification tests in early development stages (the correct time in the cycle can have benefits for quality assurance management). Globalization verification may present challenges due to a lack of globalization skilled staff, correct test cases, and funding. For instance, potential usage translatability challenges on Unix commands (e.g., "a.out --help) may not be found in some globalization verification tests under non-English language environments (e.g., if a translated message file is correct but a locale setting subroutine is missing in the Unix command).

Globalization architecture and globalization based requirements may be similar for some assets products/applications. An online globalization verification API and related framework to provide services on Globalization Data Sampling and Real Time Globalization Enablement Analytics may be created. Accordingly, aspects described herein include a pay-as-you-go online globalization verification test process and give a real-time globalization verification testing service framework to separate globalization verification testing from regular software development based on particular globalization enablement analytics.

Aspects of the disclosure include a first method, system, and computer program product of globalization testing management. In order to identify a set of globalization data which relates to a set of globalization parameters, a set of product development data of a product development environment is examined. In response to examining the set of product development data, the set of globalization data is identified. In response to identifying the set of globalization data, the set of globalization data is transmitted. In embodiments, the set of globalization parameters includes at least one of an enabled language, a locale, a routine, an application program interface, or a message buffer size. In embodiments, the set of globalization data includes at least one of an enabled language identifier, a locale identifier, a routine identifier, an application program interface identifier, or a message buffer size value.

Aspects of the disclosure include a second method, system, and computer program product of globalization testing management. A set of globalization data which relates to a set of globalization parameters is received. By processing the set of globalization data using a set of globalization testing operations, a globalization test output is determined. In response to determining the globalization test output, the globalization test output is provided. In embodiments, the set of globalization testing operations includes at least one of a translatability testing operation, an encoding testing operation, or a truncation testing operation.

Aspects of the disclosure include a third method, system, and computer program product of globalization testing management. A set of globalization data which relates to a set of globalization parameters is collected. The set of globalization data is collected for processing using a set of globalization testing operations. Based on the set of globalization data, a determination is made to execute the set of globalization testing operations. The set of globalization data is processed by executing the set of globalization testing operations. In response to processing the set of globalization data by executing the set of globalization testing operations, a set of globalization test output data is established.

In embodiments, use of the globalization testing management is metered. Based on the metered use, an invoice may be generated. Aspects can support online or cloud environment globalization verification testing which may have positive impacts on on-site support levels, security accessing management tasks, or development agility by separating globalization verification service from product development. Altogether, performance or efficiency benefits with respect to a globalization testing management can occur (e.g., speed, flexibility, responsiveness, resource usage, productivity). Aspects may save resources such as bandwidth, processing, or memory.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1, a block diagram of an example of a cloud computing node is shown. Cloud computing node 100 is only one example of a suitable cloud computing node and is not intended to suggest any limitation as to the scope of use or functionality of embodiments of the invention described herein. Regardless, cloud computing node 100 is capable of being implemented and/or performing any of the functionality set forth hereinabove.

In cloud computing node 100 there is a computer system/server 110, which is operational with numerous other general purpose or special purpose computing system environments or configurations. Examples of well-known computing systems, environments, and/or configurations that may be suitable for use with computer system/server 110 include, but are not limited to, personal computer systems, server computer systems, tablet computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 110 may be described in the general context of computer system executable instructions, such as program modules, being executed by a computer system. Generally, program modules may include routines, programs, objects, components, logic, data structures, and so on that perform particular tasks or implement particular abstract data types. Computer system/server 110 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 110 in cloud computing node 100 is shown in the form of a general-purpose computing device. The components of computer system/server 110 may include, but are not limited to, one or more processors or processing units 120, a system memory 130, and a bus 122 that couples various system components including system memory 130 to processing unit 120.

Bus 122 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 110 typically includes a variety of computer system readable media. Such media may be any available media that is accessible by computer system/server 110, and it includes both volatile and non-volatile media, removable and non-removable media. An example of removable media is shown in FIG. 1 to include a Digital Video Disc (DVD) 192.

System memory 130 can include computer system readable media in the form of volatile or non-volatile memory, such as firmware 132. Firmware 132 provides an interface to the hardware of computer system/server 110. System memory 130 can also include computer system readable media in the form of volatile memory, such as random access memory (RAM) 134 and/or cache memory 136. Computer system/server 110 may further include other removable/non-removable, volatile/non-volatile computer system storage media. By way of example only, storage system 140 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 122 by one or more data media interfaces. As will be further depicted and described below, memory 130 may include at least one program product having a set (e.g., at least one) of program modules that are configured to carry out the functions described in more detail below.

Program/utility 150, having a set (at least one) of program modules 152, may be stored in memory 130 by way of example, and not limitation, as well as an operating system, one or more application programs, other program modules, and program data. Each of the operating system, one or more application programs, other program modules, and program data or some combination thereof, may include an implementation of a networking environment. Program modules 152 generally carry out the functions and/or methodologies of embodiments of the invention as described herein.

Computer system/server 110 may also communicate with one or more external devices 190 such as a keyboard, a pointing device, a display 180, a disk drive, etc.; one or more devices that enable a user to interact with computer system/server 110; and/or any devices (e.g., network card, modem, etc.) that enable computer system/server 110 to communicate with one or more other computing devices. Such communication can occur via Input/Output (I/O) interfaces 170. Still yet, computer system/server 110 can communicate with one or more networks such as a local area network (LAN), a general wide area network (WAN), and/or a public network (e.g., the Internet) via network adapter 160. As depicted, network adapter 160 communicates with the other components of computer system/server 110 via bus 122. It should be understood that although not shown, other hardware and/or software components could be used in conjunction with computer system/server 110. Examples, include, but are not limited to: microcode, device drivers, redundant processing units, external disk drive arrays, Redundant Array of Independent Disk (RAID) systems, tape drives, data archival storage systems, etc.

Figure 2:
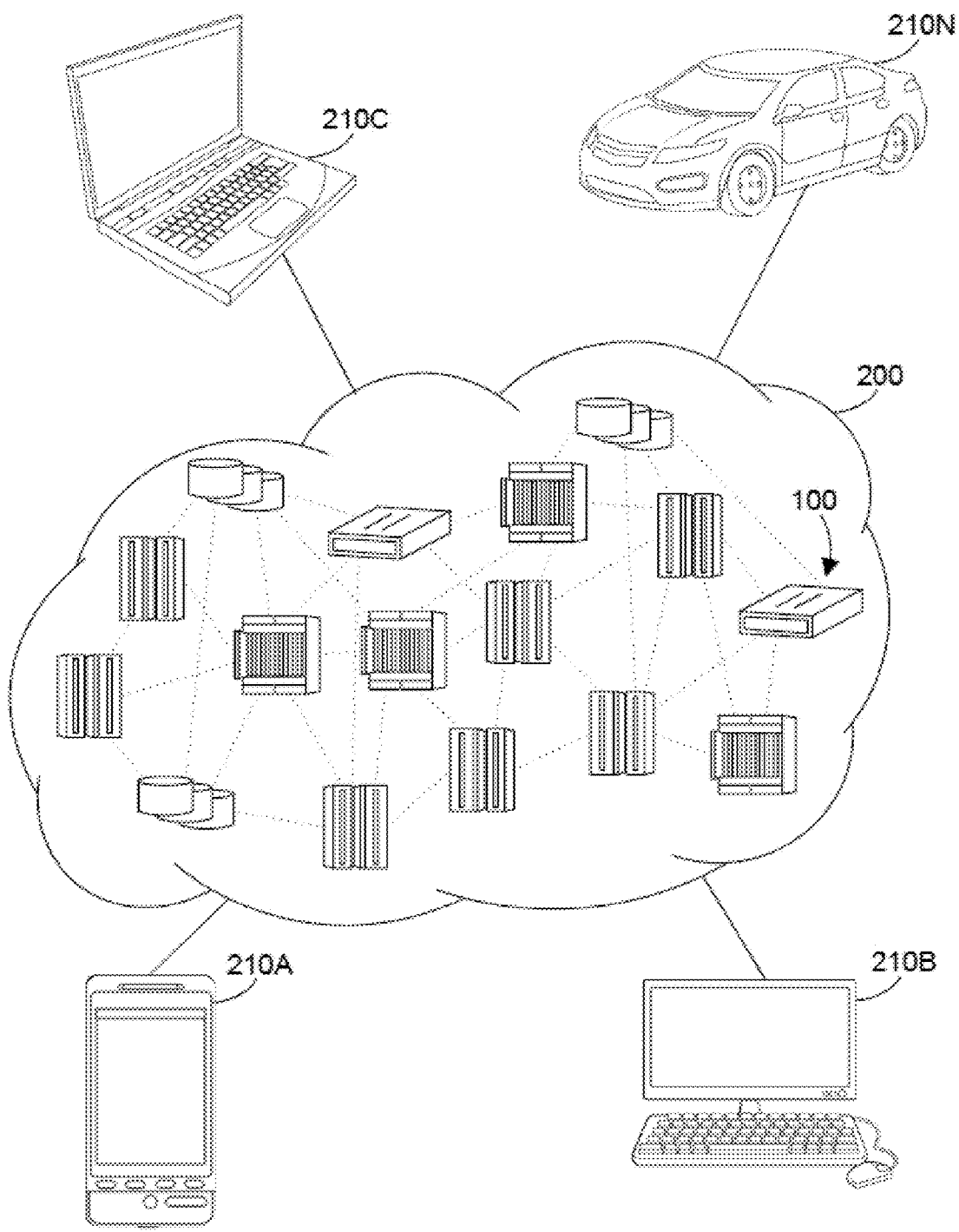
FIG. 2 depicts a cloud computing environment according to embodiments.

Referring now to FIG. 2, illustrative cloud computing environment 200 is depicted. As shown, cloud computing environment 200 comprises one or more cloud computing nodes 100 with which local computing devices used by cloud consumers, such as, for example, personal digital assistant (PDA) or cellular telephone 210A, desktop computer 210B, laptop computer 210C, and/or automobile computer system 210N may communicate. Nodes 100 may communicate with one another. They may be grouped (not shown) physically or virtually, in one or more networks, such as Private, Community, Public, or Hybrid clouds as described hereinabove, or a combination thereof. This allows cloud computing environment 200 to offer infrastructure, platforms and/or software as services for which a cloud consumer does not need to maintain resources on a local computing device. It is understood that the types of computing devices 210A-N shown in FIG. 2 are intended to be illustrative only and that computing nodes 100 and cloud computing environment 200 can communicate with any type of computerized device over any type of network and/or network addressable connection (e.g., using a web browser).

Figure 3:
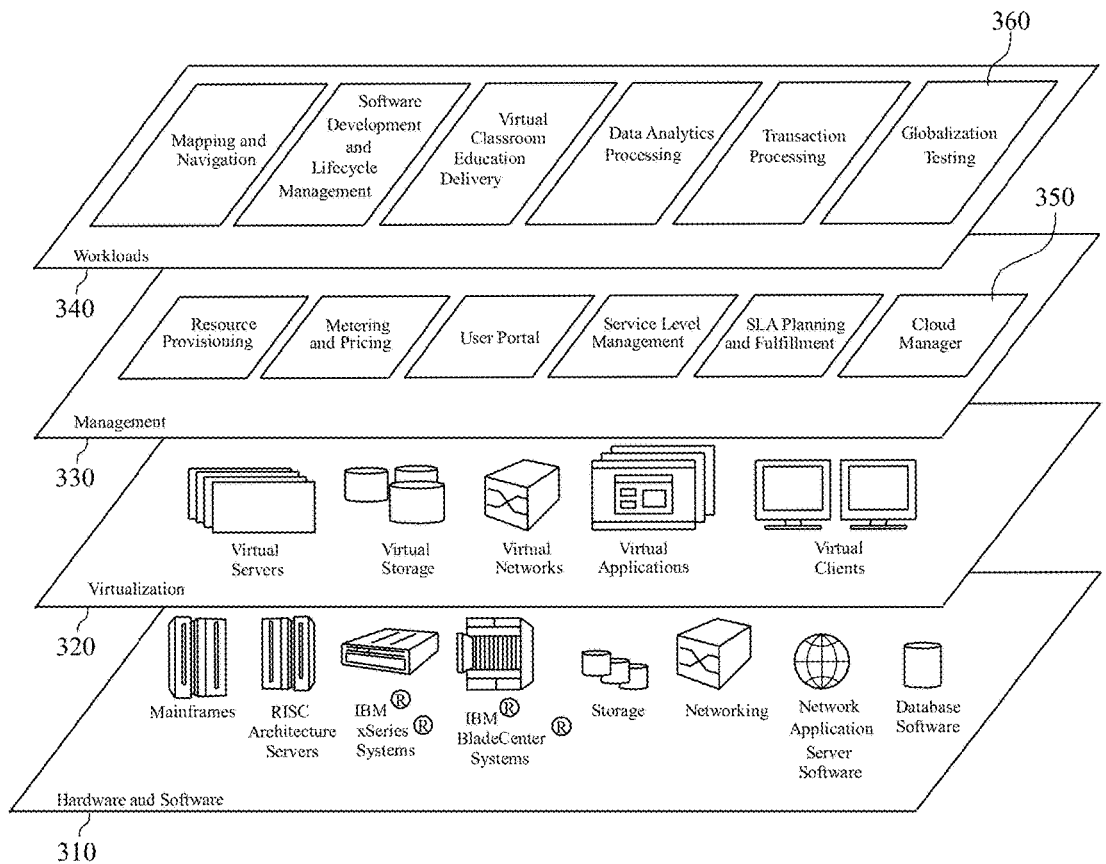
FIG. 3 depicts abstraction model layers according to embodiments.

Referring now to FIG. 3, a set of functional abstraction layers provided by cloud computing environment 200 in FIG. 2 is shown. It should be understood in advance that the components, layers, and functions shown in FIG. 3 are intended to be illustrative only and the disclosure and claims are not limited thereto. As depicted, the following layers and corresponding functions are provided.

Hardware and software layer 310 includes hardware and software components. Examples of hardware components include mainframes, in one example IBM System z systems; RISC (Reduced Instruction Set Computer) architecture based servers, in one example IBM System p systems; IBM System x systems; IBM BladeCenter systems; storage devices; networks and networking components. Examples of software components include network application server software, in one example IBM WebSphere® application server software; and database software, in one example IBM DB2® database software. IBM, System z, System p, System x, BladeCenter, WebSphere, and DB2 are trademarks of International Business Machines Corporation registered in many jurisdictions worldwide.

Virtualization layer 320 provides an abstraction layer from which the following examples of virtual entities may be provided: virtual servers; virtual storage; virtual networks, including virtual private networks; virtual applications and operating systems; and virtual clients.

In one example, management layer 330 may provide the functions described below. Resource provisioning provides dynamic procurement of computing resources and other resources that are utilized to perform tasks within the cloud computing environment. Metering and Pricing provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal provides access to the cloud computing environment for consumers and system administrators. Service level management provides cloud computing resource allocation and management such that required service levels are met. Service Level Agreement (SLA) planning and fulfillment provide pre-arrangement for, and procurement of, cloud computing resources for which a future requirement is anticipated in accordance with an SLA. A cloud manager 350 is representative of a cloud manager (or shared pool manager) as described in more detail below. While the cloud manager 350 is shown in FIG. 3 to reside in the management layer 330, cloud manager 350 can span all of the levels shown in FIG. 3, as discussed below.

Workloads layer 340 provides examples of functionality for which the cloud computing environment may be utilized. Examples of workloads and functions which may be provided from this layer include: mapping and navigation; software development and lifecycle management; virtual classroom education delivery; data analytics processing; transaction processing; and globalization testing 360, which may be utilized as discussed in more detail below.

Figure 4:
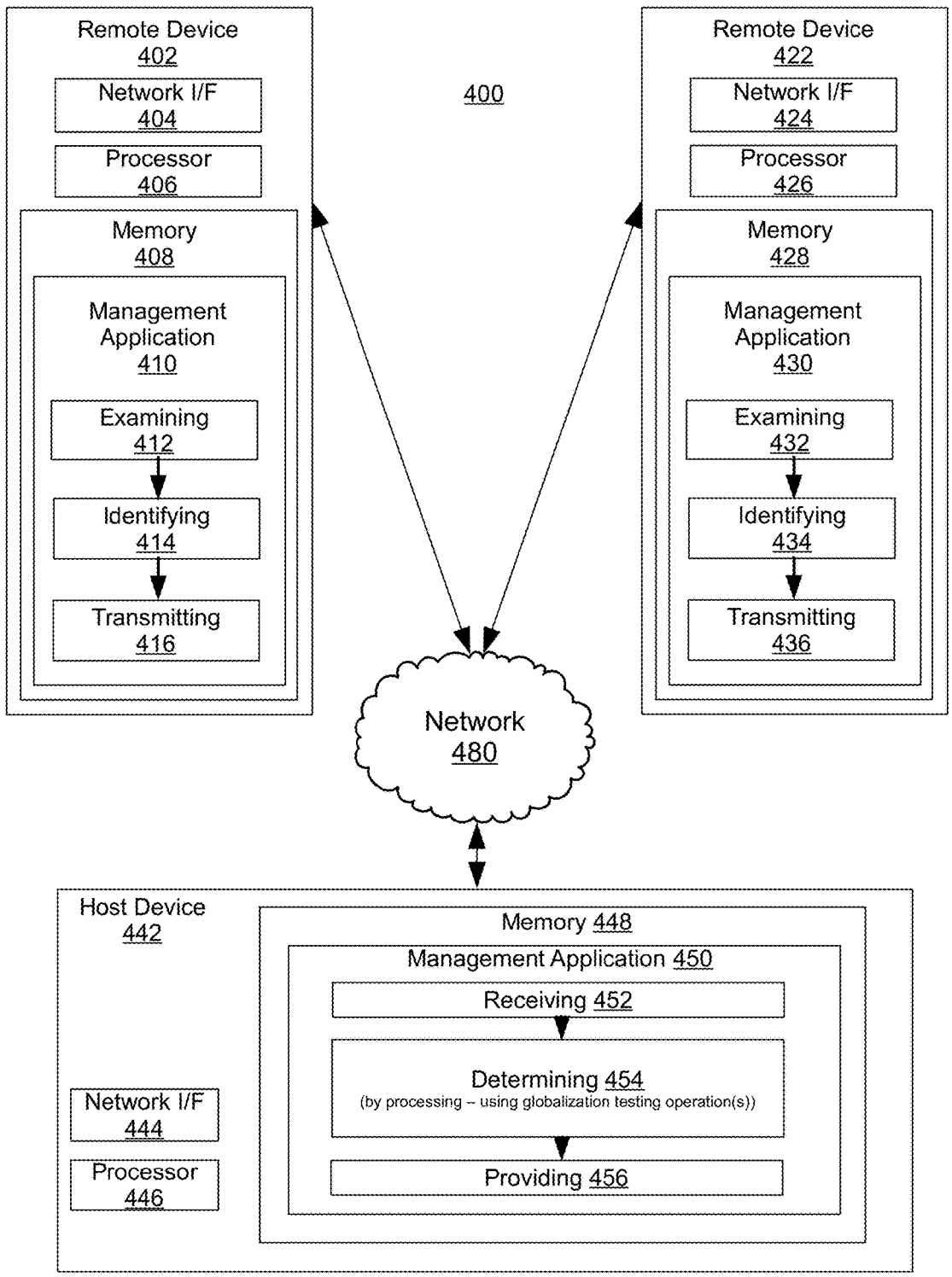
FIG. 4 depicts a computer environment for implementing aspects of a globalization testing service according to embodiments.

Referring now to FIG. 4, a computer environment 400 for implementing aspects of a globalization testing management service is depicted. Aspects of FIG. 4 are directed toward a computer environment 400 including a client-side globalization feature abstracter and a server side globalization test application programming interface (API). As shown in FIG. 4, the computer environment 400 may include one or more remote devices 402, 422 as well as one or more host devices 442. Remote devices 402, 422 and host device 442 may be distant from each other and communication over a network 480 in which the host device 442 comprises a central hub from which remote devices 402, 422 can establish a communication connection. Alternatively, the host device 442 and the host devices 402, 422 may be configured in any other suitable relationship (e.g., in a peer-to-peer or other relationship). In embodiments, the host device 442 may correspond to the server-side globalization test API and the remote devices 402, 422 may correspond to the client-side globalization feature abstracter. Other configurations are also possible.

In embodiments, the network 480 can be implemented by one or more of a number of suitable communications media (e.g., wide area network (WAN), local area network (LAN), Internet, Intranet, etc.). Alternatively, remote devices 402, 422 and host device 442 may be local to each other, and communicate via an appropriate local communication medium (e.g., local area network (LAN), hardwire, wireless link, Intranet, etc.). In certain embodiments, the network 480 can be implemented within a cloud computing environment, or using one or more cloud computing services. Consistent with various embodiments, a cloud computing environment can include a network-based, distributed data processing system that provides one or more cloud computing services. In certain embodiments, a cloud computing environment can include many computers, hundreds or thousands of them, disposed within one or more data centers and configured to share resources over the network 480.

Consistent with various embodiments, host device 442 and remote devices 402, 422 may be computer systems equipped with a display or monitor. In embodiments, the computer systems may include at least one processor 406, 426, 446 memories 408, 428, 448 and/or internal or external network interface or communications devices 404, 424, 444 (e.g., modem, network cards, etc.), optional input devices (e.g., a keyboard, mouse, or other input device), and other commercially available and custom software (e.g., browser software, communications software, server software, natural language processing software, search engine and/or web crawling software, filter modules for filtering content based upon predefined criteria, etc.). In certain embodiments, the computer systems may include server, desktop, laptop, and hand-held devices.

As shown in FIG. 4, remote device 402 may include a management application 410, remote device 422 may include a management application 430, and host device 442 may include a management application 448. In embodiments, management application 410 of remote device 402 may substantially correspond with management application 430 of remote device 422 (e.g., both management applications 410 and 430 may be configured to perform substantially the same operations perhaps serving different products thereby extracting globalization data separately/independently). For instance, in embodiments the management applications 410, 430 may include an examining operation 412, 432, an identifying operation 414, 434, and a transmitting operation 416, 436. Other operations beyond those depicted explicitly herein are also possible.

Aspects of the present disclosure are directed toward a globalization testing management service including a client-side globalization feature abstracter. Accordingly, aspects of the management applications 410, 430 of remote devices 402, 422 are directed toward facilitating client-side globalization data management. At examining operations 412, 432 a set of product development data of a product development environment may be examined to identify a set of globalization data. The set of globalization data may include data, facts, statistics, and other items of information that relate to a particular region, culture, language, setting, or other representative classification or group. The set of product development data of the product development environment may, for instance, include source code for a software application.

At identifying operation 414, 434 a set of globalization data may be identified in response to examining the set of product development data. The set of globalization data may relate to a set of globalization parameters. Generally, the globalization parameters may be a set of factors or attributes that serve as reference classifications or categories for the globalization data. In embodiments, identifying the set of globalization data may include examining source code for a software application, and extracting the factors that relate to a particular region, culture, language, or other representative group. For instance, in embodiments the identifying operations 414, 434 may identify an enabled language identifier, locale identifier, routine identifier, API identifier, or message buffer size value of the source code. Other examples of globalization data are also possible.

At transmitting operation 416, 436 in response to identifying the set of globalization data, the globalization data may be transmitted. Transmitting the set of globalization data may include sending, conveying, relaying, transferring, or otherwise communication the set of globalization data. In embodiments, the set of globalization data may be transmitted to a server-side device configured to generate a globalization test output based on the globalization data. As an example, as shown in FIG. 4, the globalization data may be transmitted from one or both of the remote devices 402, 422 to the host device 442 over network 480. The host device 442 may be configured to generate a globalization test output based on the globalization data.

Aspects of the disclosure, in embodiments, are directed toward a globalization testing service including a server-side globalization test (API). Accordingly, aspects of the management application 450 of host device 442 are directed toward facilitating server-side globalization data management. The management application 450 of host device 442 may include a receiving operation 452, a determining operation 454, and a providing operation 456. At receiving operation 452, the host device 442 may be configured to receive a set of globalization data which relates to a set of globalization parameters. In embodiments, the set of globalization data may be received from one or more remote devices 402, 422. Receiving the set of globalization data may include accepting delivery of a direct transmission from the remote devices 402, 422, submitting a request to the remote devices 402, 422 for the set of globalization data, or accessing a shared storage location and collecting the set of globalization data. In embodiments, receiving the set of globalization data may be structured as a publisher-subscription model between the server-side globalization verification system and the client side development environment. For instance, the client may subscribe to a globalization verification service provided by the server-side globalization verification system, such that the globalization data is exchanged via a data transfer operation of the globalization verification service. Other methods of receiving the set of globalization data are also possible.

At determining operation 454, a globalization test output may be determined by processing the set of globalization data using a set of globalization testing operations. Generally, the globalization testing operations may include one or more of a number of actions, procedures, activities, or other processes to evaluate one or more aspects of the set of globalization data. For instance, the globalization testing operations may include one or more of a translatability testing operation, an encoding testing operation, or a truncation testing operation. In embodiments, a globalization test output may be determined based on the results of the globalization testing operations. The globalization test output may include one or a number of actions taken to quantitatively express the outcome of the globalization testing operations. At providing operation 456, in response to determining the globalization test output, the globalization test output may be provided to one or more individuals, organizations, computing devices, or other entities. Providing the global test output may include sending, transferring, presenting, displaying, transmitting, or otherwise communicating the global test output.

Figure 5:
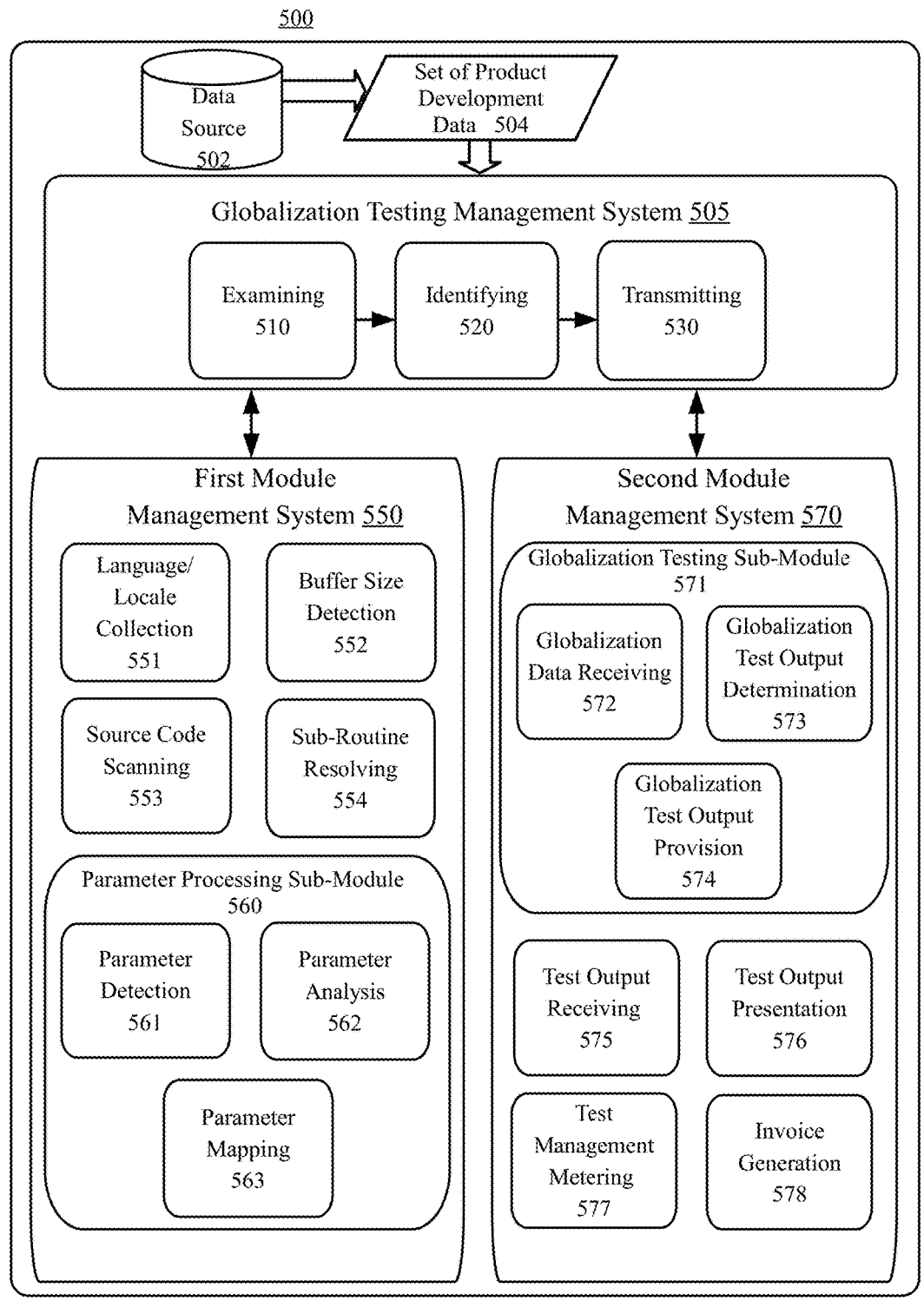
FIG. 5 depicts a block diagram illustrating a globalization testing management system.

Referring now to FIG. 5, a block diagram illustrating a globalization testing management system 500 is depicted. In embodiments the system 500 may correspond to a client-side globalization feature abstracter. Accordingly, aspects of FIG. 5 are directed toward extracting a set of globalization data from a client development environment and preparing the set of globalization data for server-side globalization testing operations. As shown in FIG. 5, the system 500 may include a data source 502, a set of product development data 504, a globalization testing management system 505, an examining operation 510, an identifying operation 520, a transmitting operation 530, a first module management system 550, a second module management system 570, and a number of sub-modules and operations configured to implement aspects of a method for globalization testing management.

As shown in FIG. 5, the system 500 may include a data source 502. The data source 502 may include a set of files, storage devices, real-time data feeds, databases, or other storage means configured to maintain data and information. For instance, the data source 502 may include an organized archive of information having one or more sets of data corresponding to different software development projects. The data in the data source 502 may be either structured or unstructured, and organized using one or more of a number of file formats (e.g., plain text, XML, SQL, Perl DBM). In embodiments, the data source 502 may include the set of product development data 504. The product development data 504 may include source code for one or more software development projects configured to undergo globalization testing. As an example, the product development data 504 may include the source code for an enterprise application software program planned for launch in multiple countries.

As described herein, the globalization testing management system 505 may include an examining operation 510, an identifying operation 520, and a transmitting operation 530. At examining operation 510, the set of product development data of a product development environment may be examined to identify a set of globalization data. Generally, the set of globalization data may include data, facts, statistics, and other aspects that relate to a particular region, culture, language, economy, setting, or other representative classification or group. For instance, the globalization data may include an enabled language identifier (e.g., label indicating the availability of a particular language, such as English), a locale identifier (e.g., reference to a particular region or area such as Brazil), a routine identifier (e.g., callout for a globalization subroutine) an application program interface identifier (e.g., code routine that calls a particular API), or a message buffer size value (e.g., integer indicating the memory to store a message body).

Examining the set of product development data 504 may include analyzing, testing, processing, evaluating, or performing a similar operation to ascertain one or more characteristics that facilitate identification of the globalization data. Generally, examining may include inspecting or scrutinizing the set of product development data to investigate elements that are locale-sensitive (e.g., require modification or adaptation for release in other regions). For instance, in certain embodiments, examining the set of product development data 504 may include scanning the source code included in the product development data 504. At source code scanning operation 553 of first module management system 550, one or more source code analysis techniques may be utilized to examine the source code. For instance, the source code may be scanned using static analysis techniques, dynamic analysis techniques, or a combination of both. Other techniques for scanning the source code are also possible.

At identifying operation 520, the set of globalization data may be identified in response to examining the set of product development data 504 (e.g., source code). The set of globalization data may relate to a set of globalization parameters. As described herein, the globalization parameters may include a set of factors or attributes that serve as categories or reference classifications for the globalization data (e.g., the globalization parameters may refer to a broad class or category of concepts rather than a specific object or idea). For instance, the globalization parameters may include an enabled language, a locale, a routine, an API, or a message buffer size. Identifying the set of globalization data may include recognizing, extracting, ascertaining, resolving, or otherwise determining one or more data objects that are relevant to the globalization testing management process.

At language and locale collection operation 551 of the first module management system 550, the identifying operation 520 may include collecting a set of enabled languages and a set of locales. In embodiments, the set of enabled languages and the set of locales may be collected in response to scanning the source code with one or more source code analysis tools. As an example, in embodiments the source code analysis tools may parse the source code and detect the following code: "console.log(req.header('Accept-Language')); // en-GB,en;q=0.8,fr; q=0.6,de;q=0.4});." Accordingly, the code analysis tool may recognize that the code element "en-GB" is a reference to British English (e.g., English-Great Britain). The language and locale collection operation 551 may extract the identified language of "English" and the locale of "Great Britain" as globalization data.

At buffer size detection module 552, the identifying operation 520 may include detecting a buffer size of a message. The buffer size may be a value that indicates the amount of memory allocated for queued messages to be sent and received. In embodiments, the message buffer size may vary based on language and locale. Accordingly, aspects of the globalization testing management process may be directed toward detecting and adjusting the message buffer size based on the language and locale in which a particular software program is deployed. In certain embodiments, the theoretical message buffer size may be calculated based on the language and locale information extracted at language and locale collection operation 551. For instance, a particular language may have a determined buffer size index (e.g., 2.8) that can be used along with the size value of the message (e.g., 12 kilobytes) to calculate the theoretical buffer size of the message (e.g., the size value of the message may be multiplied by the buffer size index to calculate the theoretical buffer size). In certain embodiments, the buffer size may be obtained in response to scanning the source code with the source code analysis tool (e.g., the message buffer size may be recorded in the source code). Other messages of detecting the message buffer size are also possible.

In response to scanning the source code of the product development data 504 at operation 553, at operation 554 one or more globalization sub-routines of the source code may be resolved. The globalization sub-routines may include a sequence of program instructions configured to perform a task associated with one or more aspects of the globalization process (e.g., locale setting, language setting, number format, time configuration). Resolving the globalization sub-routines may include identifying, in response to scanning the source code, a set of sub-routines that relate to globalization tasks. In embodiments, resolving the globalization sub-routines may include consulting a reference database including a compiled list of globalization subroutines, and comparing each sub routine used in the source code to the list of globalization sub-routines to determine which sub-routines relate to globalization tasks. For instance, sub-routines that relate to tasks such as detecting/selecting a language or region (e.g., locale) may be identified as globalization sub-routines. As an example, the sub-routine "setlocale( )" may be identified as a globalization sub-routine (e.g., the reference database may indicate that it relates to obtaining locale data for a region). Other methods of resolving the globalization sub-routines are also possible.

In embodiments, the parameter processing sub-module 560 of first module management system 550 may be configured to process a set of sub-routine parameters of the globalization sub-routines. Processing the set of sub-routine parameters may be directed toward identifying one or more globalization testing operations to perform on the globalization data. Generally, the sub-routine parameters may be specific portions or elements of the sub-routine that indicate or invoke a defined action with relation to one or more of the globalization tasks (e.g., selection of a particular language or currency, conversion to a particular number or currency format). At sub-routine parameter detection module 561, the sub-routine parameter processing sub-module 560 may be configured to detect a set of sub-routine parameters used by the set of globalization sub-routines. In embodiments, detecting the set of sub-routine parameters may include making use of a specialized source code analysis technique configured to parse the syntax of the resolved sub-routines and ascertain call-outs and keywords (e.g., language, locale, format, character, time, logical orders of sub-routines) that pertain to the globalization tasks.

Consider the following example. The source code of the set of product development data 504 may include the following lines of code:

```
#include <langinfo.h>
#include <locale.h>
main( )
{
char *ptr;
(void)setlocale(LC_ALL, " ");
ptr=nl_langinfo(CRNCYSTR);
}
```

As described herein, the code above may be scanned by one or more source code analysis techniques, and one or more sub-routines may be resolved. For instance, referring to the source code above, the sub-routines "setlocale" and "nl_langinfo" may be identified (e.g., both of these sub-routines may be listed in the reference database as sub-routines that relate to globalization tasks). In response to resolving the set of sub-routines, the sub-routines may be processed to detect one or more sub-routine parameters by the source code analysis technique. For instance, in certain embodiments, for the "setlocale" sub-routine, the parameter "(LC_ALL, " ")" may be detected, and for the "nl_langinfo" sub-routine, the parameter "CRNCYSTR" may be detected. In certain embodiments, the sub-routine parameters for a particular sub-routine may also be listed in the reference database. Other methods of detecting the sub-routine parameters are also possible.

At parameter analysis operation 562, the parameter processing sub-module may be configured to analyze the sub-routine parameters detected by the parameter detection operation 561. Analyzing the sub-routine parameters may include examining the sub-routine parameters and ascertaining a relation between a particular sub-routine parameter and one or more of the globalization testing operations. As described herein, the globalization testing operations may include at least one of a translatability testing operation, an encoding testing operation, or a truncation testing operation. Analyzing the sub-routine parameters may include using a machine learning technique configured to determine the function of the sub-routine parameter and match it to a corresponding globalization testing operation. In embodiments, the machine learning technique may execute the sub-routine and observe the result to determine the function of the sub-routine parameter. For instance, referring to the example above, the machine learning technique may execute the code and observe that the sub-routine parameter "CRNCYSTR" functions to obtain the currency string (e.g., currency symbol) for the current local (e.g., $ for U.S. dollars).

In response to observing the function/result of the sub-routine parameter, the machine learning technique may compare the sub-routine parameter and the result of the code execution to a corpus of aggregated data for past sub-routine parameters and associated globalization testing operations. Based on the comparison, at parameter mapping operation 563 the machine learning technique may be configured to map the sub-routine parameter to a corresponding globalization testing operation. Generally, mapping the sub-routine parameter may include matching, assigning, sorting, or otherwise classifying the sub-routine parameter with a globalization testing operation that substantially relates to the function of the sub-routine parameter. For example, in certain embodiments, the sub-routine parameter "CRNCYSTR" may be mapped to the encoding test operation (e.g., based on the aggregate data in the corpus, obtaining the currency string for a locale may be typically classified as an encoding operation). Other methods of mapping the sub-routine parameters are also possible. In embodiments, data regarding the analyzed sub-routine parameters and the corresponding globalization testing operations may be included in the set of globalization data.

At transmitting operation 530, in response to identifying the set of globalization data, the set of globalization data may be transmitted. Generally, transmitting the set of globalization data may include sending, conveying, relaying, transferring, or otherwise communication the set of globalization data. As described herein, in certain embodiments, aspects of the disclosure are directed toward transmitting the set of globalization data from a client-side globalization feature abstracter to a server-side globalization test application programming interface (API) to undergo globalization testing. As an example, in embodiments the set of globalization data may be uploaded to a shared server for access by the globalization testing API. In embodiments, the set of globalization may be transmitted directly to the server-side testing environment (e.g., real time data transfer over a secure network connection.) Other methods of transmitting the set of globalization data are also possible.

Aspects of the disclosure, in embodiments, relate to the recognition that it may not be desirable to disclose the source code when transmitting the set of globalization data to the server-side globalization testing environment. Accordingly, the set of globalization data transmitted from the client-side globalization feature abstracter to the server-side globalization testing environment may not include the source code of the set of product development data 504. For instance, the source code other than the set of globalization data may be removed from the set of product development data 504 after identification of the set of globalization data. In embodiments, the source code may be encrypted such that it is not accessible to unauthorized viewers.

Aspects of the disclosure relate to a second module management system 570 including a globalization testing sub-module 571 configured to implement aspects of a method for globalization testing. In embodiments, the globalization testing sub-module 571 may be located on a computer or network that is physically separate from the globalization testing management system 505 and the first module management system 550. The globalization testing sub-module 571 may include a globalization data receiving operation 572, a globalization test output determination module 573, and a globalization test output provision module 574.

At the globalization data receiving module 572, the globalization testing sub-module 571 may be configured to receive the globalization data transmitted by the transmitting operation 530 of the globalization testing management system 505. As described herein, receiving the globalization data may include accepting the transmission of the globalization data, accessing the globalization data on a shared storage device, or submitting an access request to the transmission operation 530. In response to receiving the set of globalization data, the globalization test output determination operation 573 may include processing the set of globalization data using a set of globalization testing operations. For instance, the globalization test output determination operation 573 may apply one or more of the globalization testing operations described herein (e.g., a truncation operation, an encoding operation, a translation operation) to the set of globalization data. In embodiments, the globalization testing operation performed at globalization test output determination operation 573 may be based on the mapping of one or more sub-routine parameters to the globalization testing operations at operation 563. The globalization test output may be a result or outcome generated in response to applying the globalization testing operations to the set of globalization data.

At globalization test output provision operation 574, the globalization test output generated at globalization test output determination operation 573 may be provided to one or more devices, organizations, individuals, or other entities. In embodiments, the globalization test output may be provided to the client from whom the set of product development data 504 was received. In embodiments, at operation 575, the globalization test output may be received by one or more recipients (e.g., the client). As described herein, the globalization test output may be sent directly from the globalization testing sub-module 571 to the recipient, or the globalization test output may be stored on a shared storage device accessible by one or more recipients. In embodiments, at test output presentation operation 576 the second module management system 570 may be configured to present the test output. Presenting the test output may include generating a visual explanation (e.g., slideshow, interactive walkthrough) of the globalization operations performed on the globalization data. The test output presentation 576 may be used to demonstrate the changes made to the globalization data to configure it for use in multiple countries. Other methods of presenting the test output are also possible.

Aspects of the disclosure, in embodiments, are directed toward implementing aspects of the globalization verification test process as a pay-as-you-go online service. Accordingly, at test management metering operation 577, the second module management system 570 may include metering the globalization testing management operations to assess a fee for the globalization verification process. In embodiments, the fee for the globalization verification process may be determined based on the number of portions of the source code that required revision by the globalization verification process (e.g., a greater number of revisions may correspond to a higher fee). In embodiments, the fee may be determined based on the size of the globalization data received by the globalization testing sub-module 571 (e.g., larger file sizes may be associated with higher fees). In certain embodiments, features of the globalization testing sub-module may be individually leased to the user, with the fee determined based on a tiered pricing structure and the leased features. Other methods of metering the globalization testing management operations are also possible. At invoice generation module 578, an invoice or bill stating the rendered services, fee, and other payment terms may be generated. The generated invoice may be provided (e.g., sent or transferred by email, text message, traditional mail) to the user for payment.

Figure 6:
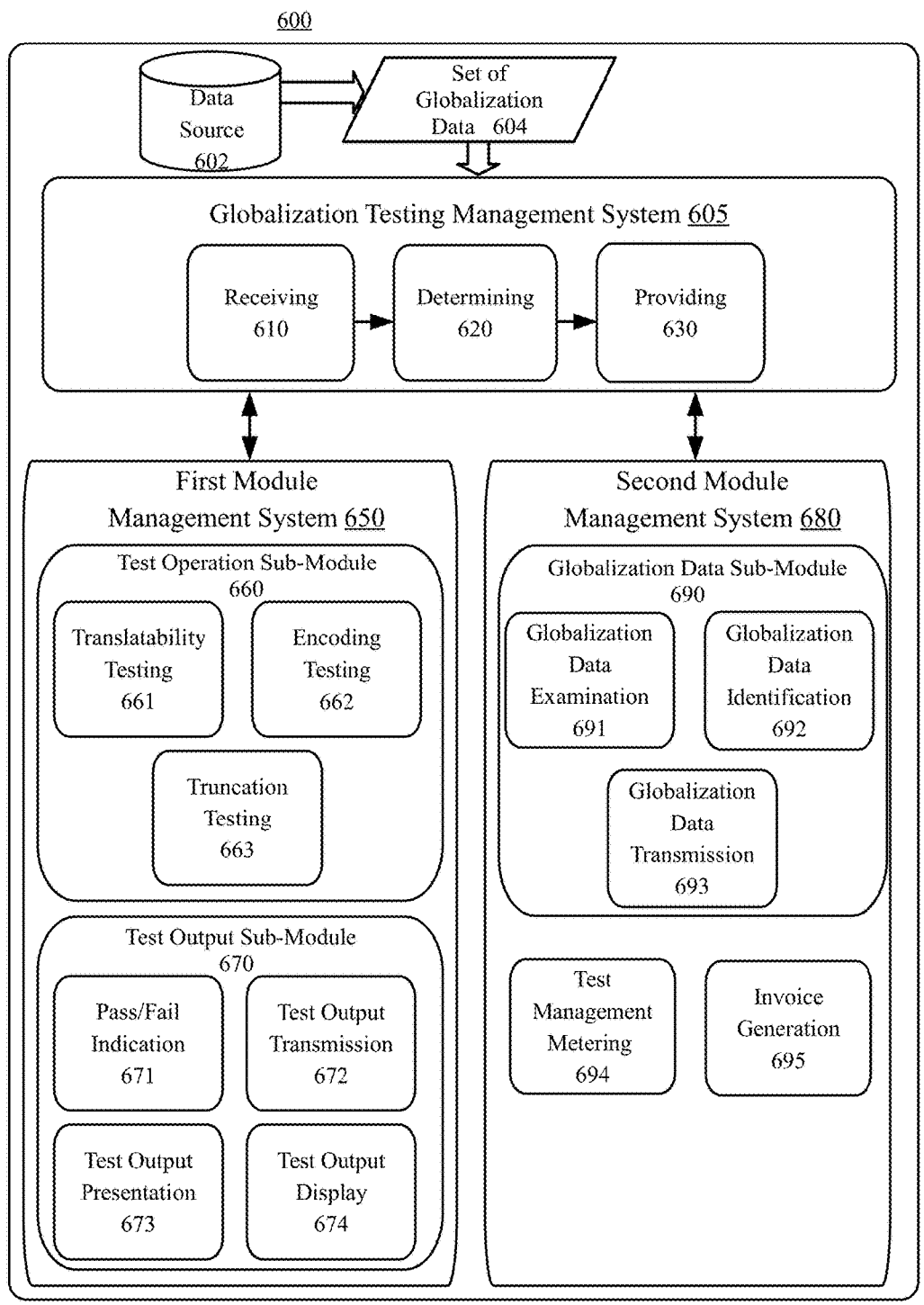
FIG. 6 depicts a block diagram illustrating a globalization testing management system.

Referring now to FIG. 6, a block diagram illustrating a globalization testing management system 600 is depicted. In embodiments the system 600 may correspond to a server-side globalization testing system. Accordingly, aspects of FIG. 6 are directed toward receiving a set of globalization data from a client-side development environment and performing one or more globalization testing operations. As shown in FIG. 6, the system 600 may include a data source 602, a set of globalization data 604, a globalization testing management system 605, a receiving operation 610, a determining operation 620, a providing operation 630, a first module management system 650, a second module management system 680, and a number of sub-modules and operations configured to implement aspects of a method for globalization testing management.

As shown in FIG. 6, the system 600 may include a data source 602. In various embodiments, the data source 602 may correspond with data source 502 of FIG. 5. In certain embodiments, the data source may be a storage device or server shared between the client-side development environment and the server-side globalization testing system. In embodiments, the data source 602 may include the set of globalization data 604. As described herein, the globalization data 604 may be received from the client-side feature extractor (e.g., the globalization testing management system 505 of FIG. 5). The globalization data 604 may include enabled language identifiers, locale identifiers, routine identifiers, API identifiers, or message buffer size values collected from the source code of the product development data 504 of FIG. 5. Other types of globalization data 604 are also possible.

As described herein, the globalization testing management system 605 may include a receiving operation 610, a determining operation 620, and a providing operation 630. At receiving operation 610, the set of globalization data 610 may be received by the globalization testing management system 605. As described herein, receiving the set of globalization data 604 may include accepting a transmission of the globalization data (e.g., from transmitting block 530 of FIG. 5), accessing the globalization data on a shared storage device (e.g., data source 602), or submitting an access request to the client-side development environment to be granted permission to view, edit, or collect the set of globalization data 604. Other methods of receiving the set of globalization data 604 are also possible.

At operation 620 a globalization test output may be determined by processing the set of globalization data using a set of globalization testing operations. Determining the globalization test output may include performing one or more of the set of globalization testing operations on the set of globalization data collected at receiving operation 610. As described herein, the globalization test output may include a quantitative evaluation of the set of globalization data generated by one or more of the globalization testing operations. For instance, the globalization test output may be an appraisal of the globalization data with respect to a set of globalization criteria configured to determine whether the globalization data is prepared for global deployment. In embodiments, the test operation sub-module 660 of the first module management system 650 may be configured to select one or more of the translatability testing operation 661, encoding testing operation 662, or truncation testing operation 663 for use with the set of globalization data 604. The one or more globalization testing operations selected to be performed on the set of globalization data may be based on the results of the parameter mapping operation 563 of FIG. 5. For instance, a sub-routine parameter mapped to the translatability testing operation may be processed at the translatability testing operation 661. Other methods of determining the globalization test output may also be possible.

At operation 630, in response to determining the globalization test output (e.g., using one or more of the global testing operations) the globalization test output may be provided. Generally, providing the globalization test output may include transferring, distributing, delivering, presenting, displaying, or otherwise conveying the globalization test output. In embodiments, the test output sub-module 670 may be configured to select one or more operations for providing the test output. Other operations beyond those described explicitly herein are also possible.

In embodiments, at pass/fail indication operation 671 providing the globalization test output may include providing a pass indicator or a fail indicator. The pass or fail indicator may be a message, appraisal, assessment, or other denotation that expresses whether or not the globalization data has been determined to be in a state of preparation for global deployment (e.g., a pass indicator) or whether it requires revision (e.g., a fail indicator). In certain embodiments, a pass or fail indicator may be provided for each globalization criterion of the globalization testing operations performed on the globalization data. As an example, the encoding test operation may include globalization criterion such as Locale-Character Set Correspondence (e.g., verifying that the letters, numbers and other characters used within the globalization data correspond to the region they're used in), Character Encoding (e.g., verification that the encoding used for the characters is supported by devices of the target locale), and Character Readability (e.g., verification that the characters are displayed correctly and are readable in a range of fonts and character sizes). Other globalization criterion are also possible. Accordingly, a pass indicator may be provided for each globalization criterion that has been achieved, while a fail indicator may be provided for each globalization criterion that has not been achieved.

In embodiments, at test output transmission operation 672, providing the globalization test output may include transmitting the globalization test output. Transmitting the globalization test output at operation 672 may substantially correspond to transmitting operation 530 of FIG. 5. In embodiments, transmitting the globalization test output may include sending the globalization test output to a physically separate computer or other device. For example, transmitting may include sending the globalization test-output to the client-side development environment for subsequent revision (e.g., of aspects of the globalization data that did not achieve pass indicators at the pass/fail indication operation 671). In embodiments, transmitting may include sending the globalization test-output to a third-party entity for downstream review, finalization or processing. Other methods of transmitting the globalization test output, as well as other recipients, are also possible.

Figure 7:
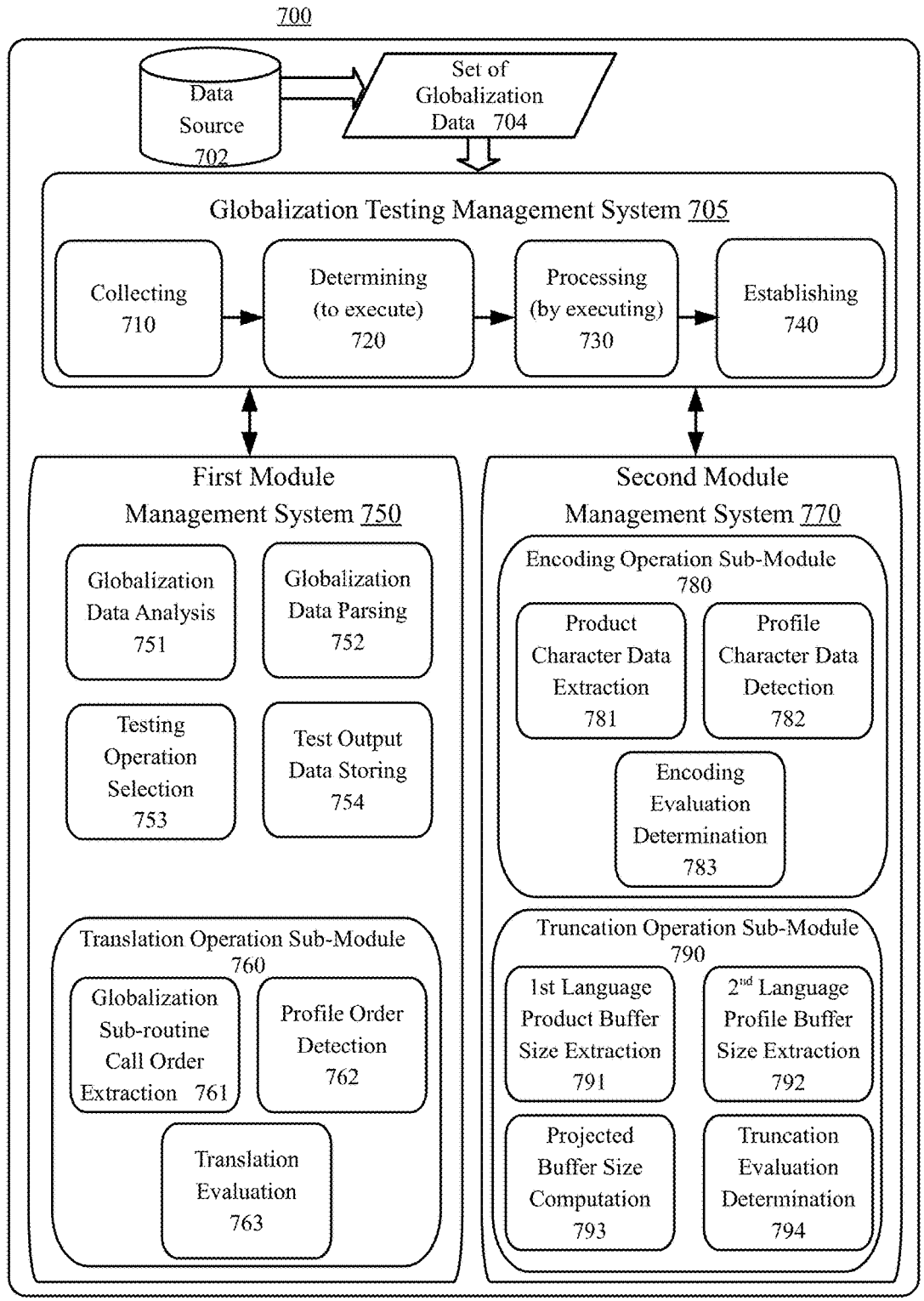
FIG. 7 depicts a block diagram illustrating a globalization testing management system.

Referring now to FIG. 7, a block diagram illustrating a globalization testing management system 700 is depicted. In embodiments, aspects of the system 700 are directed toward performing one or more globalization testing operations on a set of globalization data. As shown in FIG. 7, the system 700 may include a data source 702, a set of globalization data 704, a globalization testing management system 705, a collecting operation 710, a determining operation 720, a processing operation 730, and an establishing module 740. The system 700 may also include a first module management system 750, a second module management system 770, and a number of sub-modules and operations configured to implement aspects of a method for globalization testing management. In embodiments, aspects of the globalization testing management system 705 may correspond to the determining operation 620 of FIG. 6.

As shown in FIG. 7, the system 700 may include a data source 702. In various embodiments, the data source 702 may correspond with data source 502/602 of FIG. 5/6. In certain embodiments, the data source may be a storage device or server shared between the client-side development environment and the server-side globalization testing system. In embodiments, the data source 702 may include the set of globalization data 704. As described herein, the globalization data 704 may be received from the client-side feature extractor (e.g., the globalization testing management system 505 of FIG. 5). The globalization data 704 may include enabled language identifiers, locale identifiers, routine identifiers, API identifiers, or message buffer size values collected from the source code of the product development data 504 of FIG. 5. Other types of globalization data 704 are also possible.

As described herein, the globalization testing management system 705 may include a collecting operation 710, a determining operation 720, a processing operation 730, and an establishing operation 740. At collecting operation 710, the set of globalization data 704 may be collected for processing using a set of globalization testing operations. In embodiments, collecting the set of globalization data 704 may include obtaining the globalization data 704 by the globalization testing management system 705. For instance, collecting the set of globalization data 705 may include receiving a direct transmission of the globalization data 705 (e.g., from the client-side development environment) or accessing the globalization on a shared storage device such as data source 702. In embodiments, collecting the set of globalization data may include ingesting or importing the set of globalization data from another program or software operation. Other methods of collecting the set of globalization data 704 are also possible.

At determining operation 720, the globalization testing management system 705 may include determining to execute one or more globalization testing operations based on the set of globalization data. Generally, determining to execute the globalization testing operations may include analyzing the globalization data 704 and ascertaining whether one or more of the globalization testing operations would be applicable for execution on the globalization data 704. In embodiments, the globalization data analysis operation 751 of the first module management system 750 may be configured to perform the globalization data analysis. The globalization data analysis operation 751 may substantially correspond to the source code scanning operation 553 of FIG. 5.

For instance, analyzing can include extracting (e.g., creating a derivation), examining (e.g., performing an inspection), scanning (e.g., reviewing a sample), evaluating (e.g., generating an appraisal), dissecting (e.g., scrutinizing an attribute), resolving (e.g., ascertaining an observation/conclusion/answer), parsing (e.g., deciphering a construct), querying (e.g., asking a question), searching (e.g., exploring for a reason/ground/motivation), comparing (e.g., relating an assessment), classifying (e.g., assigning a designation), or categorizing (e.g., organizing by a feature). Data analysis may include a process of inspecting, cleaning, transforming, or modeling data to discover useful information, suggest conclusions, or support decisions. Data analysis can extract information/patterns from a data set and transform/translate it into an understandable structure (e.g., a data report which can be provided/furnished) for further use.

In embodiments, at the globalization data analysis operation 751, one or more source code analysis techniques may be utilized to examine the globalization data 704. For instance, the globalization data 704 may be examined to determine whether the software application including the globalization data 704 is planned for release in multiple countries (e.g., based on a software summary, elements of source code, client instructions, or the like). In embodiments, the determination operation 720 may be configured to detect one or more sub-routines that indicate applicability of one or more of the globalization testing operations. As an example, the determining operation may detect the "wcsftime" subroutine, which is used for formatting time displays (e.g., time display formats may vary based on the locale in which the software application is deployed). Accordingly, in response to detecting the "wcsftime" subroutine, the determining operation 720 may determine to execute one or more of the globalization testing operations (e.g., the encoding operation).

In embodiments, analyzing may include parsing the globalization data 704 at globalization data parsing operation 752. Parsing the set of globalization data 704 may include extracting one or more of an enabled language identifier, a locale identifier, a routine identifier, an API identifier, or a message buffer size value from the globalization data 704. In response to detecting one or more of these elements in the globalization data 704, the determining operation 720 may determine to execute one or more of the globalization testing operations. Other methods of determining to execute the globalization testing operations are also possible.

At testing operation selection module 753, one or more globalization testing operations may be selected (e.g., in response to analyzing the set of globalization data). In embodiments, the globalization testing operations may be selected from a candidate group of globalization testing operations. As described herein, the candidate group of globalization testing operations may include a truncation operation, a translation operation, and an encoding operation. Other globalization testing operations are also possible. In embodiments, selecting the globalization testing operations for execution on the globalization data 704 may substantially correspond to the parameter mapping operation 563 of FIG. 5. For instance, a machine learning technique may compare sub-routine parameters of the globalization data to a corpus of aggregated data for past sub-routine parameters and associated globalization testing operations, and map one or more sub-routine parameters to corresponding globalization testing operations. For example, the sub-routine parameter "LC_MESSAGES" may be mapped to the translation test operation (e.g., based on the aggregate data in the corpus, it may be determined that this sub-routine parameter relates to the generation of messages/responses and software dialogue menus in the local language, thus corresponding to the translation operation).

As described herein, the globalization testing operations may include a translation operation (e.g., translatability verification test operation). Aspects of the translation operation may be implemented at translation operation sub-module 760 of the first module management system 750. The translation operation may be configured to verify that messages and program text are displayed in the correct language for a given locale. Performing this verification may include using the globalization sub-routine call order extraction operation 761 to examine the program logic of the source code to determine whether the sub-routines are executed in the correct order and invoke the correct parameters to display a translated message in a particular language. The globalization sub-routine call order may include the order or sequence of API commands used in the set of globalization data 704 to display a translated message. Accordingly, at operation 761 aspects of the disclosure relate to extracting a detected globalization sub-routine call order from the set of globalization data 704. The globalization sub-routine call order may be detected using one or more of the source code analysis techniques described herein. In embodiments, the globalization sub-routine call order detected in the source code may be directed toward displaying a Chinese translation message. As an example, the globalization sub-routine call order extracted from the set of globalization data may be "catopen(load and open translated message file)→setlocale(set locale)→catgets(get right translated message)→print(the translated message)" (which can be an extracted order according to operation 761). Other globalization sub-routine call orders are also possible.

At profile order detection module 762 of translation operation sub-module 760, aspects of the disclosure may include detecting a profile order for a locale. The profile order for a locale may be the correct sequence of API commands to display a translated message in a particular language (e.g., whereas the globalization sub-routine call order is the actual call order found in the globalization data). In embodiments, a reference database (e.g., the reference database used for sub-routine mapping in FIG. 5) may include the profile orders for a number of locales. The profile order detection module 762 may be configured to access the reference database and detect the corresponding profile order for the targeted locale of the set of globalization data. As an example, the profile order detection module 762 may detect the sequence of commands to display a Chinese translation message to be "setlocale(set locale) catopen(load and open translated, message file)→catgets(get right translated message)→print(the translated message)" (which can be a correct and expected order).

At translation evaluation operation 763, the translation operation sub-module. 760 may be configured to determine a translation evaluation for the locale. In embodiments, determining the translation operation for the locale may be determined by comparing the globalization sub-routine call order with the profile order. In the event that the globalization sub-routine call order matches the profile order of the reference database, the globalization data may be assigned a pass indicator, while a fail indicator may be assigned if the globalization sub-routine call order does not match the profile order. Referring once again to the examples described herein, the product order of "catopen(load and open translated message file)→setlocale(set locale)→catgets(get right translated message)→print(the translated message)" may compared to the profile order of "setlocale(set locale) →catopen(load and open translated message file)→catgets (get right translated message)→print(the translated message)." In embodiments, the translation evaluation operation 763 may determine that the product order of the globalization data 704 does not match the profile order for the locale as listed in the reference database. Accordingly, the globalization operation may be assigned a fail indicator by the translation evaluation operation 763.

As described herein, the globalization testing operations may include an encoding operation. Aspects of the encoding operation may be implemented at encoding operation sub-module 780 of the second module management system 770. The encoding operation may be configured to verify that text and messages are displayed using the correct character set and encoding for a given locale and language environment. Accordingly, product character data extraction operation 781 may be configured to extract a set of product character data from the set of globalization data 704. The set of product character data may be a code, name, alias, or other identifier for the character set used to display messages and text in the globalization data 704. For instance, IBM-856 may be an example of a character set used to support Hebrew characters. In embodiments, extracting the set of product character data may include parsing the set of globalization data 704 and locating a sub-routine or command where the product character data is explicitly invoked or called (e.g., "charset "IBM-856""). In embodiments, extracting the set of product character data may include extracting sample text of the target character set, and comparing it to a database of known product character data sets to identify it. Other methods of extracting the set of product character data are also possible.

At profile character data detection operation 782, the encoding operation sub-module 780 may be configured to detect a set of profile character data for a locale. The profile character data for a locale may be one or more standardized character sets that are verified for use in a particular country or region. Detecting the set of profile character data for the locale may include consulting an index or directory of listed locales and corresponding standardized character sets. As an example, in certain embodiments, for a software application that is intended for release in Korea, the profile character detection operation 782 may consult the index or standardized character sets and detect that the "IBM-eucKR" code set is the industry standard code set used to support Korean countries. Other methods of detecting the set of profile character data are also possible.

At encoding evaluation determination module 783, the encoding operation sub-module 780 may be configured to compare the set of product character data with the set of profile character data in order to determine an encoding evaluation for the locale. Generally, if the set of product character data does not correspond with the set of profile character data, then the related character set and language configuration may not be correct. For example, consider a scenario in which a software application that is intended for release in Japan is determined to use the "IBM-eucTW" product character data set. In response to comparing the set of product character data with the detected set of profile character data, it may be determined that the correct language configuration is "IBM-eucJP." Accordingly, the "IBM-eucTW" product character set may be determined to be incorrect (e.g., the current configuration may lead to the display of garbled/illegible characters), and the encoding operation may assign a failure indicator to the globalization data 704. Other methods of evaluating the encoding of the globalization data 704 are also possible.

As described herein, the globalization testing operations may include a truncation operation. Aspects of the truncation operation may be implemented at truncation operation sub-module 790 of the second module management system 770. The truncation operation may be configured to verify that numbers, dates, currencies and other characters are displayed in the correct language and format for a given locale. Additionally, aspects of the truncation operation may be directed toward verifying buffer file sizes for messages and dialogues in translated languages. Accordingly, aspects of the truncation operation may be directed toward computing a theoretical buffer size for a translated language. As described herein, the buffer size may be a value that indicates the amount of memory allocated for queued messages (e.g., program usage data, help dialogues, error messages, warnings, program status) to be presented to users. In embodiments, the message buffer size may vary based on language and locale. Accordingly, aspects of the truncation operation sub-module 790 may be directed toward detecting and evaluating the message buffer size based on the language and locale in which a particular software program is deployed.

In embodiments, at the first language product buffer size extraction operation 791, the second module management system 770 may be configured to extract a product buffer size for a first language from the set of globalization data. In embodiments, calculating the theoretical message buffer size may be based on the language and locale information extracted from the globalization data 704. For instance, the first language product buffer size extraction operation may detect a first language based on the sub-routines of the globalization data. As an example, based on a sub-routine of "console.log(req.header('Accept-Language')); // en-GB,en; q=0.8,fr;q=0.6,de;q=0.4});." the first language may be detected as British English (e.g., the code "en-GB" may be recognized as corresponding to British English).

In response to detecting the first language, at second language profile buffer size extraction operation 792 a profile buffer size may be detected for a second language. In embodiments, the second language may be a target language into which the first language is configured to be translated. Detecting the second language profile buffer size may include consulting a buffer size index to determine a buffer size index value for the second language. The buffer size index value may be a fixed value for a particular language that indicates the relative amount of memory needed to store a message in the target language as compared to a reference language. Accordingly, at second language profile buffer size extraction operation 792, a buffer size index may be consulted to determine a buffer size index value for a second language. As an example, in a scenario where the messages of the software application are to be displayed in Japanese, (e.g., translated from British English to Japanese), the buffer size index may indicate that the buffer size index value for Japanese is 2.8 with respect to English.

At projected buffer size computation operation 793, the truncation operation sub-module 790 may be configured to use the product buffer size and the profile buffer size to compute a projected buffer size for a message. The projected buffer size may be a calculated estimate of the amount of memory one or more messages translated from the first language to the second language are expected to require. In certain embodiments, calculating the projected buffer size may be a function of the product buffer size (e.g., of the first language) and the profile buffer size (e.g., second language buffer size index value). For instance, the projected buffer size may be the product of the profile buffer size and the product buffer size. As an example, in a scenario where the profile buffer size of a message in British English is 2 kilobytes and the buffer size index value for Japanese is 2.38, the calculated projected buffer size for the message may be determined to be 4.76 kilobytes. Other methods of computing the projected buffer size for a translated message are also possible.

At truncation evaluation determination operation 794, the truncation operation sub-module 790 may be configured to compare the projected buffer size with a threshold buffer size to determine a truncation evaluation for the second language. The threshold buffer size may be a predetermined or user-defined (maximum) acceptable value for the projected buffer size of a translated message. In embodiments, each translated message may be compared to the threshold buffer size on an individual basis. Messages that exceed the threshold buffer size may be assigned fail indicators, while messages that are below the threshold buffer size may be assigned pass indicators. In embodiments, the threshold buffer size may be an aggregate threshold value, such that the sum total of all translated messages may not exceed the threshold buffer size. As an example, in certain embodiments the threshold buffer size for a single message may be 20 kilobytes. Accordingly, with reference to the example above, the projected buffer size of 4.76 kilobytes may be compared to the threshold buffer size of 20 kilobytes, and a truncation evaluation may be determined. In embodiments, the translated message may be assigned a pass indicator. Other methods of determining the truncation evaluation are also possible.

As described herein, in certain embodiments other globalization verification modules/operations may be included/added and configured (e.g., using a pay-as-you-go service similar to those described herein such as the encoding/truncation operations). Other contemplated (though not limited to) testing features may include monetary, time, regular expression, etc. Consider the following example. In embodiments, a set of globalization data for a software application planned for release in Turkey may be analyzed by the encoding operation to determine whether the Turkish locale language configuration is correct under the Unicode standard encoding format. Another operation sub-module may be configured to extract the locale seed file "TR_TR.UTF-8.src," and confirm the entry of the toupper mapping table directory "<LATIN_SMALL_LETTER_DOTLESS_I>, <LATIN_CAPITAL_LETTER_I>". Unicode software not configured for Turkish language support lowercases the character "I" to "i," and uppercases "i" to "I," which is incorrect as the Turkish language distinguishes between the dotted and dotless "I" (e.g., I,i as compared to İ,ı). Accordingly, the another operation sub-module may check the toupper mapping table directory to verify whether support for the dotted and dotless "I" is correctly enabled. Support for the dotted and dotless "I" may indicate that the Turkish locale language configuration is correct under Unicode standard, and the set of globalization data may be assigned a pass indicator with respect the encoding operation, while failure to support the dotted and dotless "I" may result in a fail indicator assigned to the set of globalization data 704.

As described herein, in certain embodiments other globalization verification modules/operations may be included/added and configured (e.g., using a pay-as-you-go service similar to those described herein such as the encoding/truncation operations). Other contemplated (though not limited to) testing features may include a cloud API configured to verify that numbers, dates, currencies, or other characters are presented/displayed in an appropriate/correct language and format for a given locale. Consider the following example. An example operation sub-module may be configured to verify that the currency API strmon( ) is correct for both the French/Luxembourg and French/Canada regions. Accordingly, the example operation sub-module may be configured to extract the locale seed files "FR_LU.UTF-8.src" and "FR.UTF-8.src" from the globalization data 704 and verify whether or not the currency format and currency abbreviation conform with international standards. In embodiments, the example operation sub-module may be configured to access a reference database and compare the currency format of the locale seed files with the international standards described in the reference database. For instance, the international standards may indicate that, for the French/Luxembourg region, currency is listed in the format "123.456,79 EUR," while currency is listed in the format "123,456,79 CAD" in the French/Canada region. Accordingly, the locale seed files extracted from the globalization data may be compared to the international standards described in the reference database to verify whether the currency format is correct (e.g., and is thus assigned a pass indicator) or incorrect (e.g., and is thus assigned a fail indicator).

Aspects of the disclosure, in certain embodiments, aspects of the pay-as-you-go globalization verification service described herein may include revising the set of globalization data 704 to configure it for deployment in one or more specified target countries. For instance, in response to receiving a fail indication from one or more of the globalization testing operations, the globalization testing management system 700 may be configured to edit the globalization data and adapt it to conform with the globalization criterion for the corresponding globalization testing operation. In embodiments, revising the globalization data may include using a machine learning technique to correct one or more elements of the globalization data based on a corpus of aggregate source code for other software applications. In certain embodiments, revising the globalization data may include generating a set of candidate suggestions to include with the test output provided to the client side development environment. Other methods of revising the globalization data are also possible.

Figure 8:
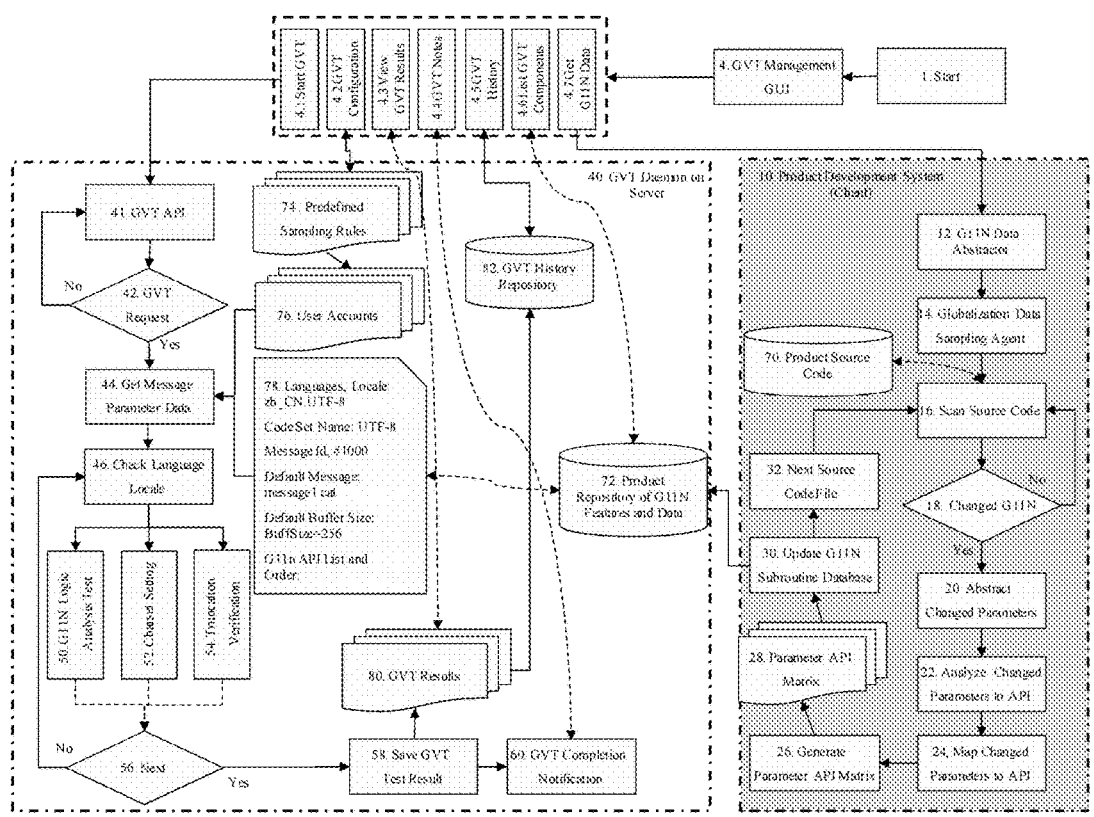
FIG. 8 depicts a flowchart illustrating a method for globalization verification management.

Referring now to FIG. 8, a flowchart illustrating a globalization testing management method 800 is depicted. Aspects of FIG. 8 are directed toward a globalization verification method that makes use of a client side globalization feature abstracter and a server side globalization test API. As described herein, the client side globalization feature abstracter may be configured to extract a set of globalization data from a client development environment and prepare the set of globalization data for server-side globalization testing operations. A set of product development data (e.g., source code) may be examined to identify a set of globalization data. In response to examining the set of globalization data, the globalization data may be transmitted to the server-side globalization test API to undergo one or more globalization verification testing operations. In embodiments, aspects of FIG. 8 may substantially correspond to the globalization testing management system 505 of FIG. 5 and the globalization testing management system 605 of FIG. 6.

Figure 9:
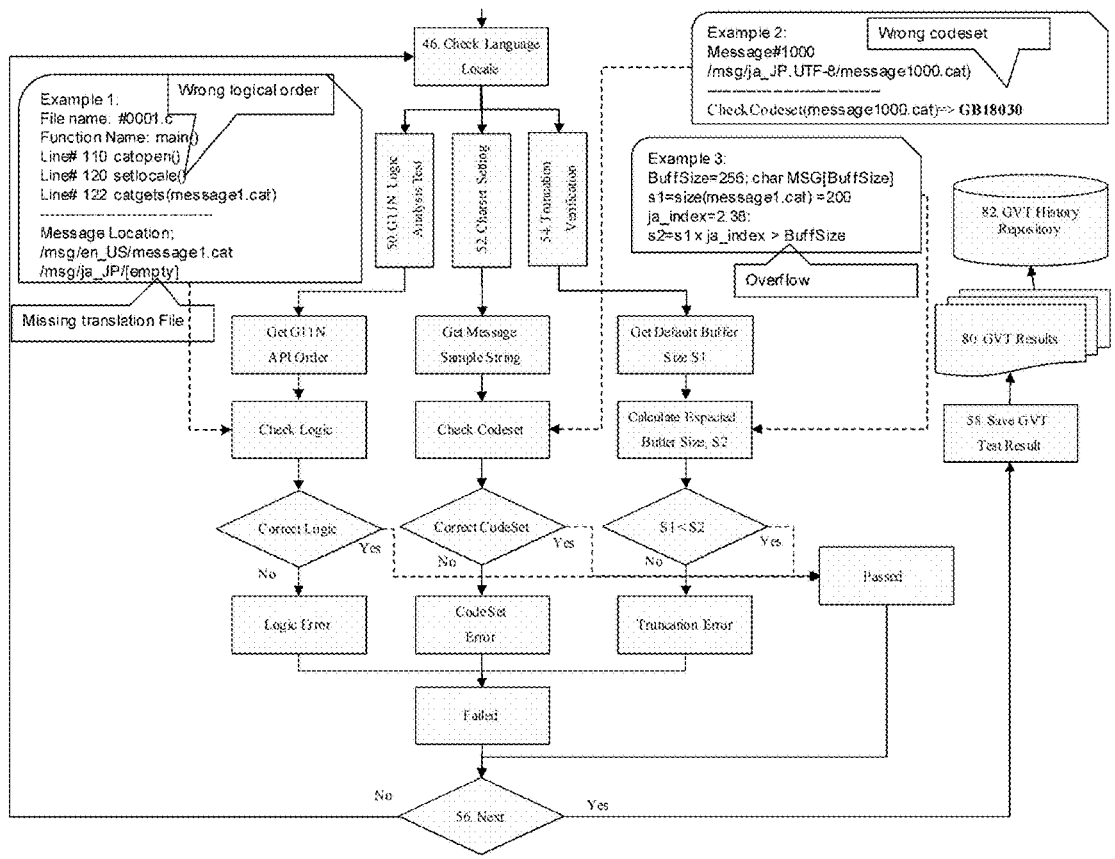
FIG. 9 depicts a flowchart illustrating a method for globalization verification management.

Referring now to FIG. 9, a flowchart illustrating a globalization testing management method 900 is depicted. Aspects of FIG. 9 are directed toward performing one or more globalization verification tests on the set of globalization data. As described herein, the globalization verification tests may include a truncation operation, an encoding operation, and a translation operation (e.g., G11N logic evaluation). In response to performing one or more of the verification test operations on the globalization data, the globalization testing management system 900 may be configured to determine a globalization test output (e.g., pass/fail indicators for the one or more test operations) and provide the globalization test output to the client-side development environment. In embodiments, aspects of FIG. 9 may substantially correspond to the globalization testing management system 705 of FIG. 7.

In addition to embodiments described above, other embodiments having fewer operational steps, more operational steps, or different operational steps are contemplated. Also, some embodiments may perform some or all of the above operational steps in a different order. In embodiments, operational steps may be performed in response to other operational steps. The modules are listed and described illustratively according to an embodiment and are not meant to indicate necessity of a particular module or exclusivity of other potential modules (or functions/purposes as applied to a specific module).

In the foregoing, reference is made to various embodiments. It should be understood, however, that this disclosure is not limited to the specifically described embodiments. Instead, any combination of the described features and elements, whether related to different embodiments or not, is contemplated to implement and practice this disclosure. Many modifications and variations may be apparent to those of ordinary skill in the art without departing from the scope and spirit of the described embodiments. Furthermore, although embodiments of this disclosure may achieve advantages over other possible solutions or over the prior art, whether or not a particular advantage is achieved by a given embodiment is not limiting of this disclosure. Thus, the described aspects, features, embodiments, and advantages are merely illustrative and are not considered elements or limitations of the appended claims except where explicitly recited in a claim(s).

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

Embodiments according to this disclosure may be provided to end-users through a cloud-computing infrastructure. Cloud computing generally refers to the provision of scalable computing resources as a service over a network. More formally, cloud computing may be defined as a computing capability that provides an abstraction between the computing resource and its underlying technical architecture (e.g., servers, storage, networks), enabling convenient, on-demand network access to a shared pool of configurable computing resources that can be rapidly provisioned and released with minimal management effort or service provider interaction. Thus, cloud computing allows a user to access virtual computing resources (e.g., storage, data, applications, and even complete virtualized computing systems) in "the cloud," without regard for the underlying physical systems (or locations of those systems) used to provide the computing resources.

Typically, cloud-computing resources are provided to a user on a pay-per-use basis, where users are charged only for the computing resources actually used (e.g., an amount of storage space used by a user or a number of virtualized systems instantiated by the user). A user can access any of the resources that reside in the cloud at any time, and from anywhere across the Internet. In context of the present disclosure, a user may access applications or related data available in the cloud. For example, the nodes used to create a stream computing application may be virtual machines hosted by a cloud service provider. Doing so allows a user to access this information from any computing system attached to a network connected to the cloud (e.g., the Internet).

Embodiments of the present disclosure may also be delivered as part of a service engagement with a client corporation, nonprofit organization, government entity, internal organizational structure, or the like. These embodiments may include configuring a computer system to perform, and deploying software, hardware, and web services that implement, some or all of the methods described herein. These embodiments may also include analyzing the client's operations, creating recommendations responsive to the analysis, building systems that implement portions of the recommendations, integrating the systems into existing processes and infrastructure, metering use of the systems, allocating expenses to users of the systems, and billing for use of the systems.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the foregoing is directed to exemplary embodiments, other and further embodiments of the invention may be devised without departing from the basic scope thereof, and the scope thereof is determined by the claims that follow. The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to explain the principles of the embodiments, the practical application or technical improvement over technologies found in the marketplace, or to enable others of ordinary skill in the art to understand the embodiments disclosed herein.

What is claimed is:

1. A computer-implemented method of globalization testing management by a server, the method comprising:
    collecting, by the server and for processing using a set of globalization testing operations, a set of globalization data which relates to a set of globalization parameters;
    determining, based on the set of globalization data, to execute the set of globalization testing operations by the server;
    processing the set of globalization data by executing the set of globalization testing operations by the server;
    establishing, by the server in response to processing the set of globalization data by executing the set of globalization testing operations, a set of globalization test output data;
    determining, by the server based on the set of globalization test output data, a globalization test output; and
    providing, by the server in response to determining the globalization test output, the globalization test output.

2. The method of claim 1, wherein the set of globalization parameters includes:
    a locale and a message buffer size; and
    wherein the set of globalization data includes:
    a locale identifier and a message buffer size value.

3. The method of claim 1, wherein determining, based on the set of globalization data, to execute the set of globalization testing operations includes:
    analyzing the set of globalization data; and
    selecting, both based on and in response to analyzing the set of globalization data, the set of globalization testing operations from a candidate group of globalization testing operations, wherein the candidate group of globalization testing operations is selected from the group consisting of:
    a truncation testing operation,
    a translatability testing operation, and
    an encoding testing operation.

4. The method of claim 1, wherein the set of globalization testing operations includes a translatability testing operation to determine a translation evaluation for a locale.

5. The method of claim 4, wherein the translatability testing operation includes:
    extracting, from the set of globalization data, a globalization sub-routine call order;
    detecting a profile order for the locale which indicates a set of application program interface (API) commands for utilization to present a translated message in a particular language; and
    determining, by comparing the globalization sub-routine call order with the profile order, the translation evaluation for the locale.

6. The method of claim 1, wherein the set of globalization testing operations includes an encoding testing operation to determine an encoding evaluation for a locale.

7. The method of claim 6, wherein the encoding testing operation includes:
    extracting, from the set of globalization data, a set of product character data;
    detecting a set of profile character data for the locale; and
    determining, by comparing the set of product character data with the set of profile character data, the encoding evaluation for the locale.

8. The method of claim 7, wherein the set of product character data includes a first encoding for a language, the set of profile character data includes a second encoding for the language, and wherein the encoding evaluation further comprises:
    assigning a fail indicator to the set of globalization data.

9. The method of claim 1, wherein the set of globalization testing operations includes a truncation testing operation to determine a truncation evaluation for a second language to verify that a first selection from a first group consisting of a set of numbers, a set of dates, a set of currencies, and a set of characters are configured for presentation in a second selection from a second group consisting of an appropriate language for a locale and an appropriate format for the locale.

10. The method of claim 9, wherein the truncation testing operation includes:
   extracting, from the set of globalization data, a product buffer size for a first language;
   detecting a profile buffer size for the second language;
   computing, using both the product buffer size and the profile buffer size, a projected buffer size; and
   determining, by comparing the projected buffer size with a threshold buffer size, the truncation evaluation for the second language.

11. The method of claim 1, further comprising:
   parsing the set of globalization data to extract a selection from a group consisting of at least one of: an enabled language identifier, a locale identifier, a routine identifier, an application program interface identifier, or a message buffer size value; and
   extracting, from the set of globalization data, the selection from the group consisting of at least one of: the enabled language identifier, the locale identifier, the routine identifier, the application program interface identifier, or the message buffer size value.

12. The method of claim 1, wherein the collecting, the determining, the processing, and the establishing each occur in an automated fashion without user intervention and without a test case.

13. The method of claim 1, further comprising:
   metering use of the globalization testing management without relying-on a test case; and
   generating an invoice based on the metered use.

14. The method of claim 1, wherein the server uses a cloud-based application program interface.

15. The method of claim 1, wherein providing the globalization test output is selected from the group consisting of:
   providing a pass indicator,
   providing a fail indicator,
   sending the globalization test output to a physically separate computer,
   presenting the globalization test output, and
   displaying the globalization test output.

16. The method of claim 14, further comprising:
   sending, by the server which uses the cloud-based application program interface to verify that a first selection from a first group consisting of a set of numbers, a set of dates, a set of currencies, and a set of characters are configured for presentation in a second selection from a second group consisting of an appropriate language for a locale and an appropriate format for the locale, the globalization test output to a physically separate computer.

17. The method of claim 1, wherein:
   the set of globalization data indicates a first selection from a first group consisting of data, facts, statistics, and information that relates to a second selection from a second group consisting of a region, a culture, a language, and a setting; and
   the set of globalization parameters indicates a third selection from a third group consisting of a set of factors and a set of attributes that relates to a fourth selection from a fourth group consisting of a set of reference classifications for the set of globalization data and a set of reference categories for the set of globalization data.

18. A system for globalization testing management by a server, the system comprising:
   a memory having a set of computer readable computer instructions, and
   a processor for executing the set of computer readable instructions, the set of computer readable instructions including:
   collecting, by the server and for processing using a set of globalization testing operations, a set of globalization data which relates to a set of globalization parameters;
   determining, based on the set of globalization data, to execute the set of globalization testing operations by the server;
   processing the set of globalization data by executing the set of globalization testing operations by the server;
   establishing, by the server in response to processing the set of globalization data by executing the set of globalization testing operations, a set of globalization test output data;
   determining, by the server based on the set of globalization test output data, a globalization test output; and
   providing, by the server in response to determining the globalization test output, the globalization test output.

19. A computer program product for globalization testing management by a server, the computer program product comprising a computer readable storage medium having program instructions embodied therewith, wherein the computer readable storage medium is not a transitory signal per se, the program instructions executable by a processor to cause the processor to perform a method comprising:
   collecting, by the server and for processing using a set of globalization testing operations, a set of globalization data which relates to a set of globalization parameters;
   determining, based on the set of globalization data, to execute the set of globalization testing operations by the server;
   processing the set of globalization data by executing the set of globalization testing operations by the server;
   establishing, by the server in response to processing the set of globalization data by executing the set of globalization testing operations, a set of globalization test output data;
   determining, by the server based on the set of globalization test output data, a globalization test output; and
   providing, by the server in response to determining the globalization test output, the globalization test output.

20. The computer program product of claim 19, wherein at least one of:
   the program instructions are stored in the computer readable storage medium in a data processing system, and wherein the program instructions were downloaded over a network from a remote data processing system; or
   the program instructions are stored in the computer readable storage medium in a server data processing system, and wherein the program instructions are downloaded over a network to the remote data processing system for use in a second computer readable storage medium with the remote data processing system.

* * * * *